(12) United States Patent
Suhara et al.

(10) Patent No.: US 7,047,715 B2
(45) Date of Patent: May 23, 2006

(54) RUNNING MOWER

(75) Inventors: Yasuyuki Suhara, Osaka (JP); Naoto Yamanaka, Osaka (JP)

(73) Assignee: Yanmar Agricultural Equipment Co., Ltd., Osaka (JP)

( * ) Notice: Subject to any disclaimer, the term of this patent is extended or adjusted under 35 U.S.C. 154(b) by 202 days.

(21) Appl. No.: 10/497,885

(22) PCT Filed: Mar. 12, 2003

(86) PCT No.: PCT/JP03/02956

§ 371 (c)(1),
(2), (4) Date: Jun. 4, 2004

(87) PCT Pub. No.: WO2004/026021

PCT Pub. Date: Apr. 1, 2004

(65) Prior Publication Data

US 2005/0005587 A1    Jan. 13, 2005

(30) Foreign Application Priority Data

Sep. 19, 2002    (JP) ............................. 2002-273424

(51) Int. Cl.
*A01D 61/00* (2006.01)
(52) U.S. Cl. ....................... 56/16.6; 180/371
(58) Field of Classification Search ................ 56/16.6, 56/320.2, 202; 180/371, 374, 375, 6.5
See application file for complete search history.

(56) References Cited

U.S. PATENT DOCUMENTS 3,969,876 A    7/1976    Turos

| 6,012,273 | A | * | 1/2000 | Ogasawara et al. .......... 56/16.6 |
| 6,431,305 | B1 | * | 8/2002 | Ishimori et al. ............. 180/371 |
| 2002/0011375 | A1 | * | 1/2002 | Ishimori et al. ............. 180/298 |
| 2004/0112027 | A1 | * | 6/2004 | Komorida et al. ............ 56/202 |

FOREIGN PATENT DOCUMENTS

| FR | 2 790 908 | 9/2000 |
| JP | 9-9757 | 1/1997 |
| JP | 9-51709 | 2/1997 |
| JP | 2000-262124 | 9/2000 |
| JP | 2001-45827 | 2/2001 |

* cited by examiner

*Primary Examiner*—Árpád Fábián Kovács
(74) *Attorney, Agent, or Firm*—Hamre, Schumann, Mueller & Larson, P.C.

(57) ABSTRACT

A running mower includes a traveling body 1 supported by a pair of front wheels 2 and a pair of rear wheels 3, a rotary mowing unit 12 vertically movably mounted to the traveling body between the front wheels and the rear wheels, and an outlet duct 23 extending backward for discharging mowed grass. A downwardly open channel-shaped upper duct 57 covers an outlet 58 of the rotary mowing unit for mowed grass. The upper duct has a rear end inserted into an upper front end of the outlet duct 23. The outlet duct 23 is channel-shaped to be downwardly open. The underside of the outlet duct is provided with an upwardly open channel-shaped lower duct 61 forming a bottom element of the outlet duct and having a vertically movable front end. The front end of the lower duct moves together with the rotary mowing unit, so that the mowed grass is smoothly discharged even if the mowing height of the rotary mowing unit is lowered.

4 Claims, 15 Drawing Sheets

RUNNING MOWER

BACKGROUND OF THE INVENTION

1. Field of the Invention

The present invention relates to a running mower comprising a traveling body provided with a vertically movable rotary mowing unit.

2. Description of the Related Art

Conventionally, this kind of running mower includes a traveling body supported by front wheels and rear wheels. The traveling body is provided, between the front wheel and the rear wheels, with a vertically movable rotary mowing unit for mowing grass to a proper height from the ground (Refer to JP A 9-09757).

The conventional running mower is provided with an outlet arranged at a side of the rotary mowing unit for discharging grass mowed by the rotary mowing unit. This structure increases the width of the mower thereby enlarging the size.

Recently, a rotary mowing unit is known which includes an outlet duct extending backward between the rear wheels at the downside of the traveling body. The rotary mowing unit mow grass to discharge backward through the outlet duct.

The rotary mowing unit is vertically movable relative to the traveling body for adjusting mowing height and for running without mowing. Thus, the outlet duct extending backward from the rotary mowing unit should move vertically together with the rotary mowing unit. As a result, there is a problem that the structure is complicated and the height of the traveling body from the ground should be raised.

A technical object of the present invention is to solve the above-described problems.

DISCLOSURE OF THE INVENTION

According to a first aspect of the present invention, a running mower comprises a traveling body supported by a pair of front wheels and a pair of rear wheels, a rotary mowing unit vertically movably mounted to the traveling body between the front wheels and the rear wheels; and an outlet duct for mowed grass extending backward from underside of the traveling body between the rear wheels. The rotary mowing unit includes an upside provided with a downwardly open channel-shaped upper duct for covering an outlet for mowed grass. The upper duct is pivotally connected for allowing a rear end of the upper duct to move up and down. The rear end of the upper duct is inserted into an upper front end of the outlet duct. The outlet duct is channel-shaped to be downwardly open, and the underside of the outlet duct is provided with an upwardly open channel-shaped lower duct forming a bottom member of the outlet duct. The lower duct has a rear end pivotally connected for allowing a front end of the lower duct to move up and down, the front end of the lower duct being operatively connected to an up-down mechanism for the rotary mowing unit.

Due to the above structure, the grass mowed by the rotary mowing unit is introduced into the outlet duct through the upper duct and the lower duct to be discharged backward from the outlet duct. As a result, the rotary mowing unit can vertically move without moving the outlet duct, whereby the structure can be simplified while the height from the ground to the traveling body or the height of the traveling body can be reduced.

When the rotary mowing unit moves downward toward the ground for lowering the mowing height, the front end of the lower duct is lowered accordingly. As a result, the mowed grass can be introduced reliably and smoothly into the outlet duct through the lower duct even when the mowing height is lowered, whereby the outlet duct is reliably prevented from being clogged up.

According to the first aspect of the present invention, the outlet duct includes a front end provided with sealing plates made of a soft elastic material. The sealing plates extend inwardly from both sides of the outlet duct while also extending vertically. The sealing plates made of a soft elastic material closes the gaps inevitably formed between the inner surfaces of the outlet duct and the outer surfaces of the upper duct inserted into the outlet duct. As a result, it is possible to restrain the gaps from adversely affecting the ability of discharging the mowed grass through the outlet duct while allowing the upper duct to pivot.

According to a second aspect of the present invention, besides the features according to the first aspect, the traveling body is provided with a laterally spaced pair of side frames. The side frames are interconnected to each other by a pipe for rotatably receiving an operating shaft for rotational operation by an up-down lever. The operating shaft is operatively connected to the rotary mowing unit which vertically moves in response to rotation of the operating shaft.

The pipe interconnects the side frames of the traveling body while supporting the operating shaft relative to the traveling body for vertically moving the rotary mowing unit. In other words, the pipe can be used as a member for interconnecting the side frames of the traveling body as well as a member for supporting the operating shaft relative to the traveling body. As a result, additionally to the advantages of the first aspect, it is possible to realize simplification of the structure of the traveling body while also realizing a reduction of the size, weight and manufacturing cost.

According to the second aspect of the present invention, the pipe pivotally supports a speed change lever connector and/or a brake lever connector. The speed change lever connector transmits movement of a speed change pedal arranged on the traveling body to a speed change mechanism of the traveling body. The brake connector transmits movement of a brake pedal arranged on the traveling body to a brake of the traveling body. Due to this structure, the pipe can further be used for pivotally supporting both of the speed change lever connector and/or the brake lever connector relative to the traveling body, thereby strengthening the above-described advantages.

Other objects, features, and advantages will be apparent in the following description of the embodiments with reference to the accompanying drawings.

DETAILED DESCRIPTION OF THE PREFERRED EMBODIMENTS

Figure 1:
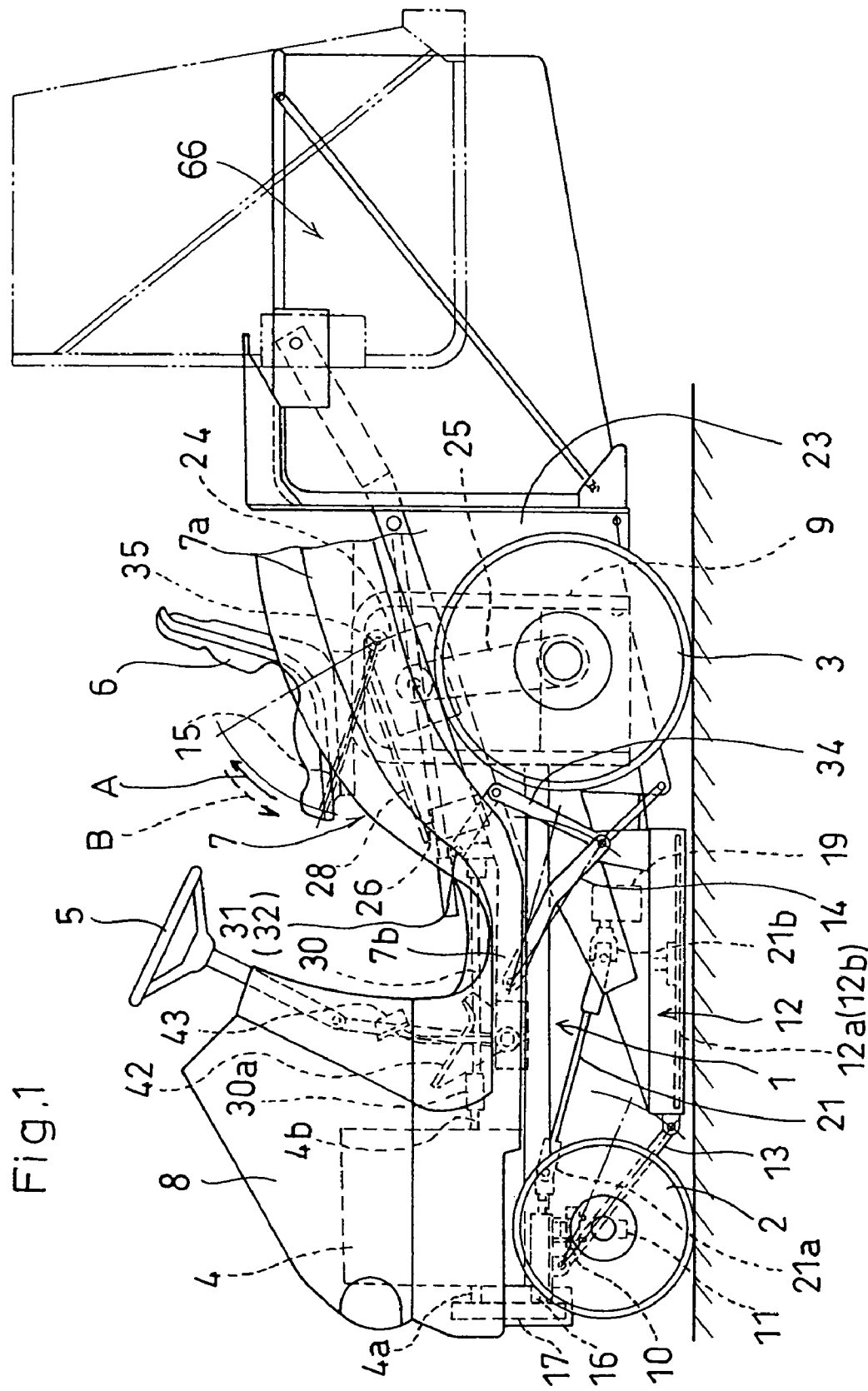
FIG. 1 is a side view of a running mower according to an embodiment of the present invention.
Figure 2:
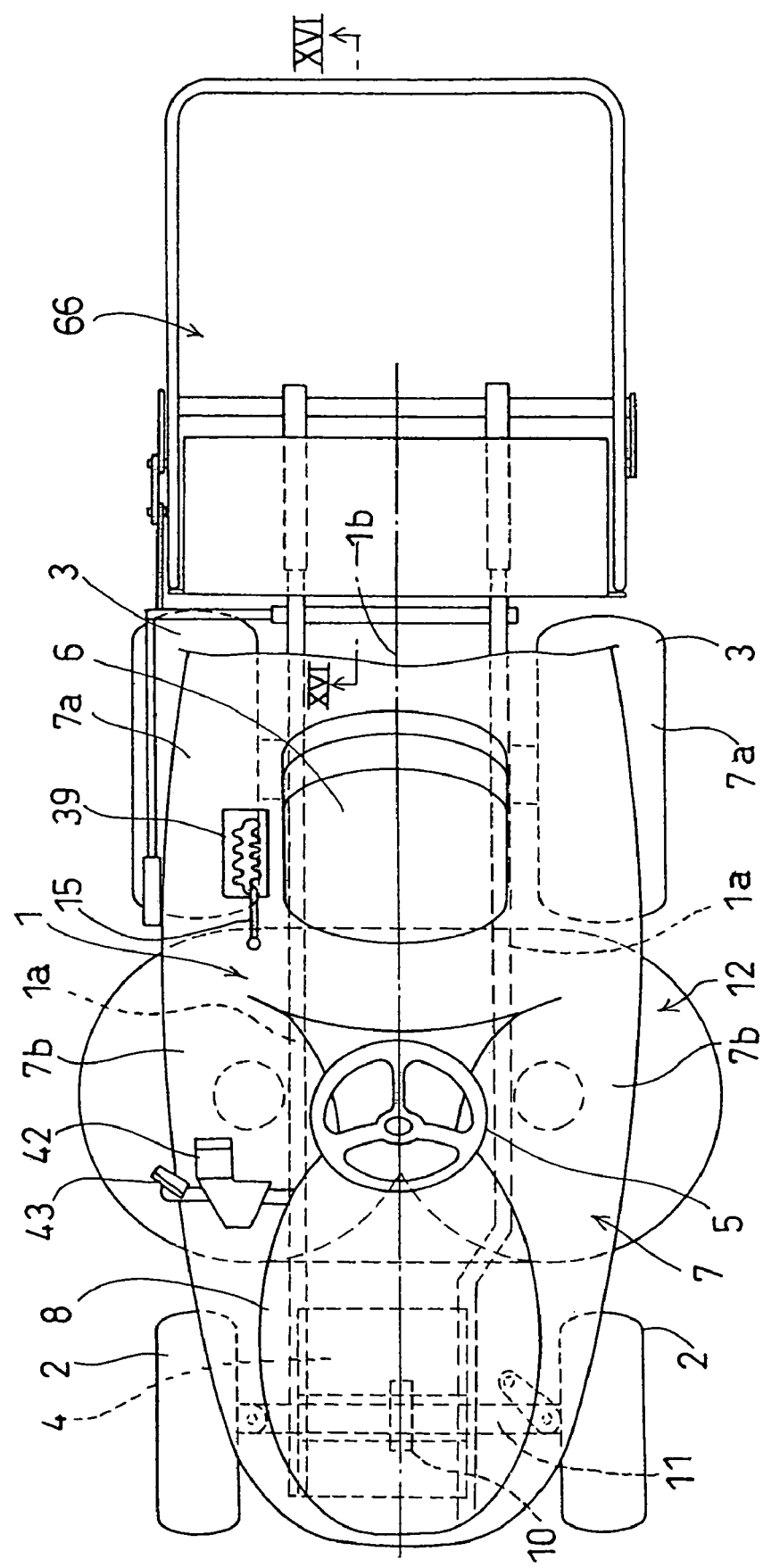
FIG. 2 is a plan view of FIG. 1.
Figure 3:
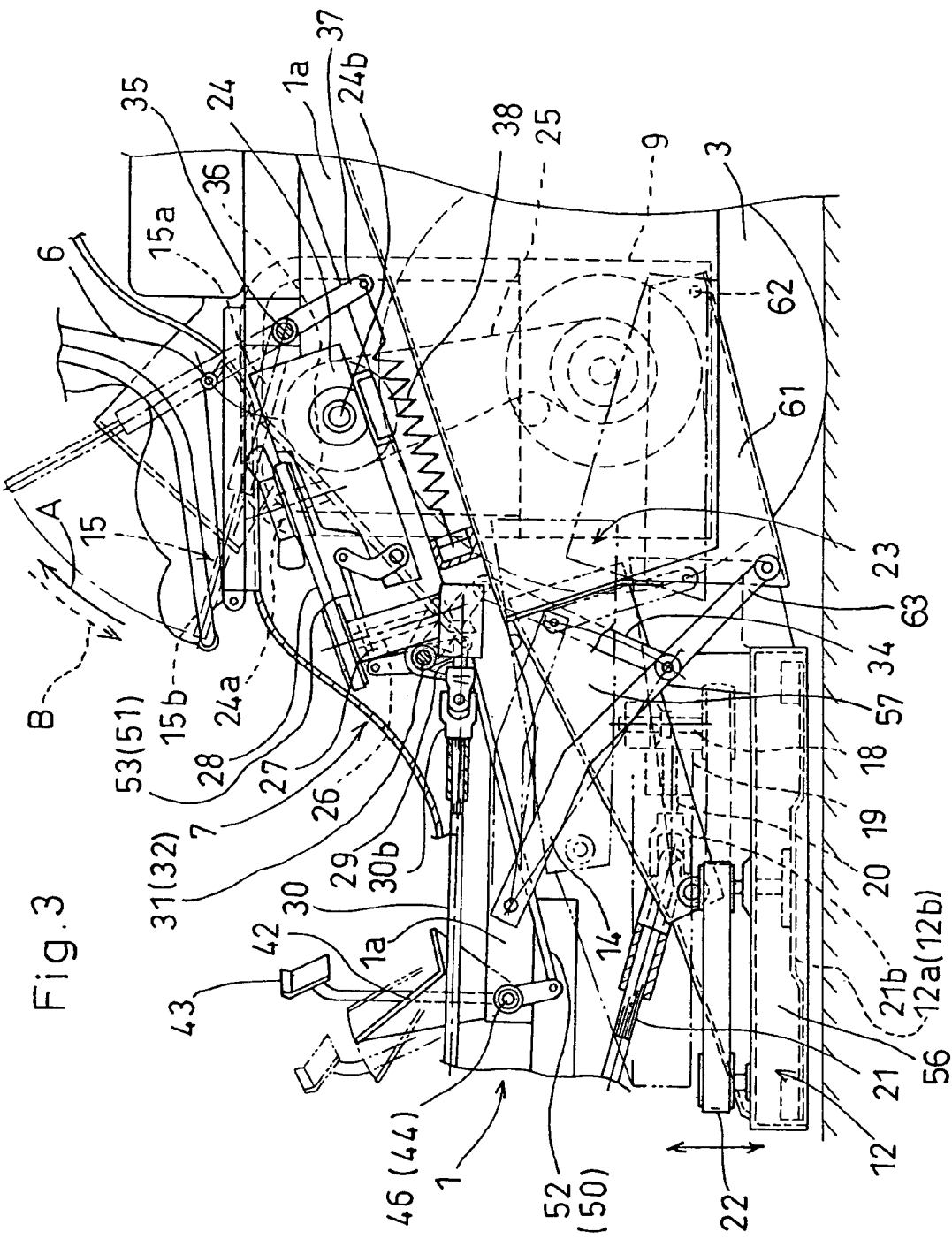
FIG. 3 is an enlarged view showing a principal part of FIG. 1.

In the drawings, reference number 1 represents a traveling body. The traveling body 1 comprises a laterally spaced pair of side frames 1a extending lengthwise of the traveling body in parallel to each other. The traveling body is supported by a laterally spaced pair of front wheels 2 at the front part well as by a laterally spaced pair of rear wheels 3 at the rear part. The front part of the traveling body 1 is provided, on its upside, with an engine 4 and a steering wheel 5 for simultaneously pivoting both of the front wheels 2, whereas the rear part of the traveling body 1 is provided, on its upside, with a seat 6 for an operator.

The upside of the traveling body 1 is entirely covered by a cowling 7 which includes a fender 7a for covering both of the rear wheels 3 from above, and a step 7b located in front of the operator seat. The cowling 7 is provided with an openable or removable hood 8 for covering the engine 4.

The traveling body 1 includes brackets 9 fixed laterally outwardly to the side frames 1a in a vertically extending posture. The brackets support the rear wheels 3 at their lower ends.

On the other hand, the front wheels 2 are pivoted to both ends of a front axle 11 for horizontal pivotal movement. The front axle is pivoted centrally to a center pin 10 for vertical pivotal movement. The center pin is located under a front part of the traveling body 1 on a center line 1b as seen widthwise in plan view. Due to the pivotal movement of the front axle 11 about the center pin 10, the front wheels 2 move in opposite directions. Specifically, when one of the front wheels moves upward, the other front wheel moves downward.

The traveling body 1 includes a rotary mowing unit 12 with a laterally spaced pair of mowing blades 12a, 12b and a housing 56 for covering the mowing blades 12a, 12b. The rotary mowing unit is mounted to the underside of the traveling body between the front wheels 2 and the rear wheels 3 for vertical movement by a laterally spaced pair of front links 13 and a laterally spaced pair of rear links 14. The rotary mowing unit can be moved up and down by pivotally operating an up-down lever 15 disposed at the right side of the operator seat 6.

The engine 4 is provided with output shafts 4a and 4b projecting forward and backward from the engine 4, respectively. The output shaft 4a projecting forward transmits its torque via a belt 17 to an intermediate shaft 16. The intermediate shaft is supported at the front part above the center pin 10 and extends lengthwise of the traveling body.

Figure 4:
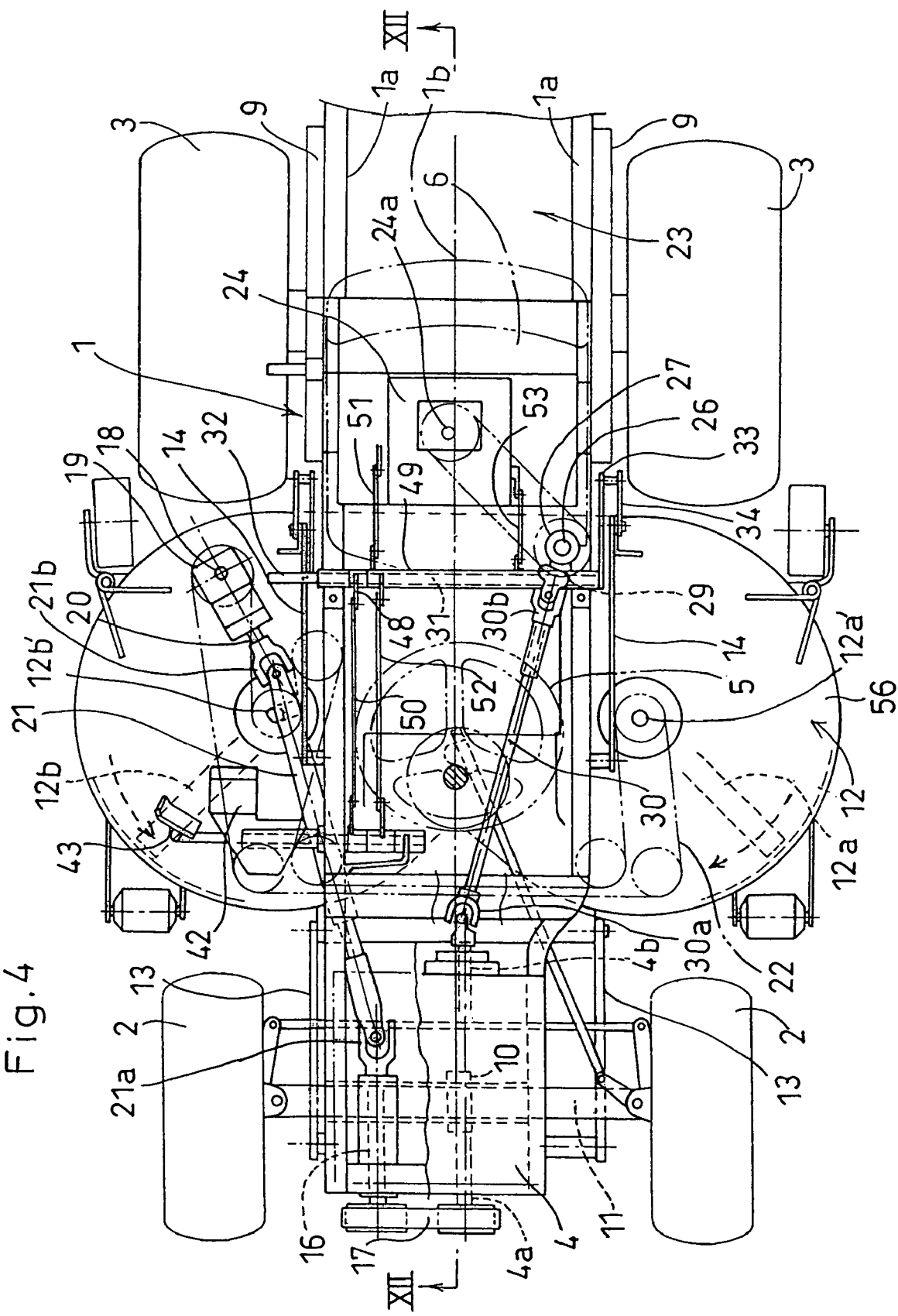
FIG. 4 is a plan view of FIG. 3.
Figure 5:
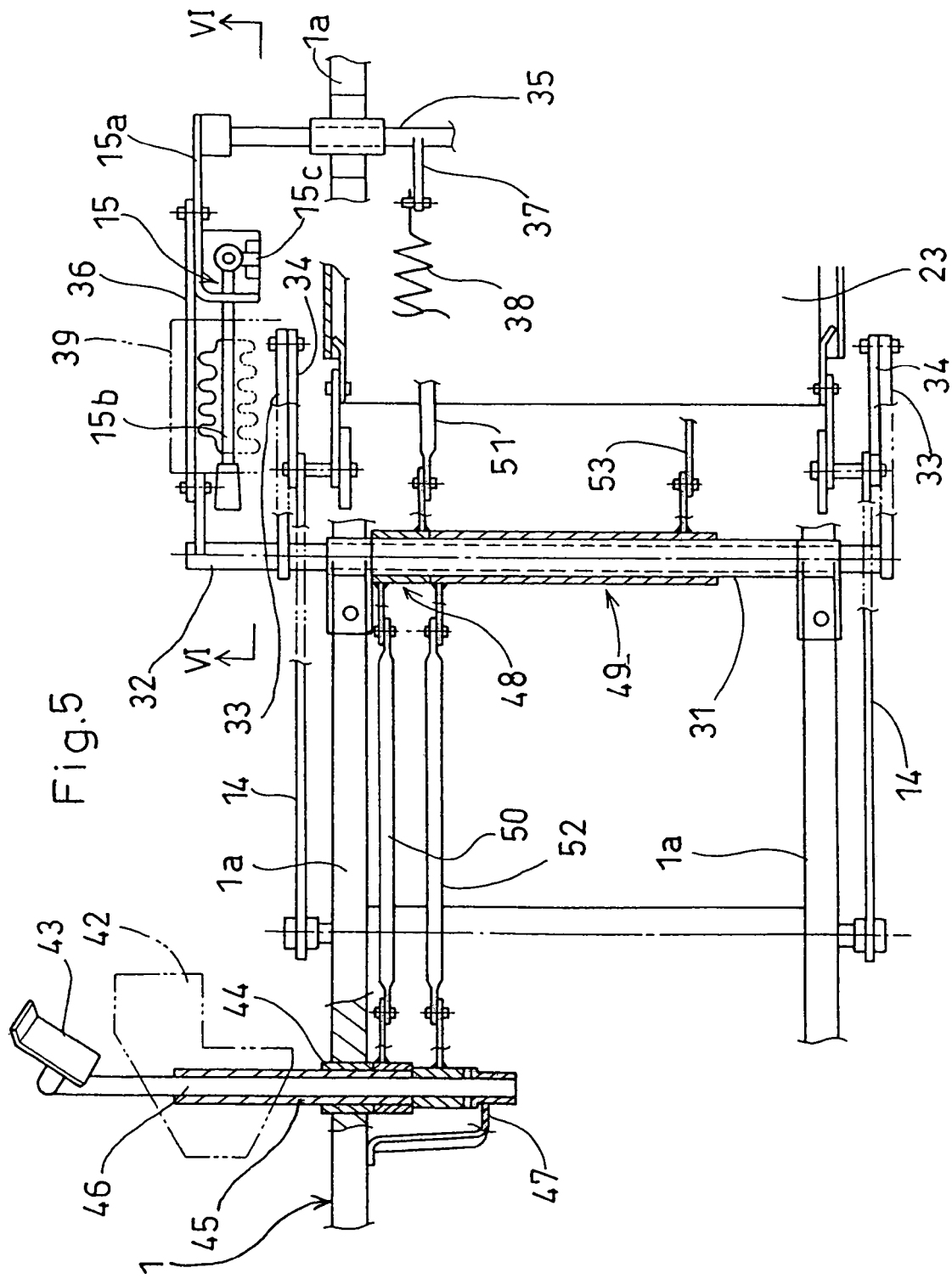
FIG. 5 is an enlarged view showing a principal part of FIG. 4.

The upside of the rotary mowing unit 12 is provided with a gear case 19 in which a vertical shaft 18 is rotatably supported. The gear case 19 rotatably supports an input shaft 20 for engagement with the vertical shaft 18 via bevel gears, while the input shaft 20 extends forwardly horizontally from the gear case. An extensible transmission shaft 21 is connected at both ends to the front end of the input shaft 20 and to the rear end of the intermediate shaft 16 via universal joints 21a, 21b, respectively. The power of the engine 4 is transmitted to the vertical shaft 18 through the intermediate shaft 16, the transmission shaft 21, and the input shaft 20. The rotation of the vertical shaft 18 is then transmitted to the mowing blades 12a, 12b via an endless belt 22 wound around the vertical shaft 18 and shafts 12a', 12b' of the mowing blades 12a, 12b. As a result, the mowing blades rotate inwardly toward each other in the moving direction of the traveling body as indicated by broken line arrows in FIG. 4.

The upside of the rotary mowing unit 12 is provided with an outlet duct 23 which is open at the bottom for discharging grass mown by the mowing blades 12a, 12b of the rotary mowing unit 12. The outlet duct extends backward between the rear wheels 3, or more precisely, between the laterally spaced pair of brackets 9 to which the rear wheels 3 are mounted.

The rotation of the engine 4 is transmitted to the rear wheels 3 via a transmission 24 which is provided above the outlet duct 23 and below the operator seat 6. The transmission 24 is provided with an upstanding input shaft 24a projecting upward, and output shafts 24b projecting laterally outwardly from both sides of the transmission 24. The rotation of the output shafts is transmitted via endless chains 25 to the rear wheels 3.

Though it is not illustrated, the transmission 24 includes a gearbox for changing gear steplessly as well as a brake for the rear wheels 3.

In front of and adjacent the transmission 24, an upwardly extending intermediate shaft 26 is rotatably supported in a gear case 27 attached to the traveling body 1. The upper end of the intermediate shaft 26 is fitted in winding engagement with an endless belt 35 which in turn is held in winding engagement with the input shaft 24a of the transmission 24. The underside of the gear case 27 supporting the intermediate shaft 26 is provided with a horizontal shaft 29 that projects forward in engagement with the intermediate shaft 26 via bevel gears. The horizontal shaft 29 is connected to the output shaft 4b extending backward from the engine 4, by means of an extensible transmission shaft 30 having universal joints 30a, 30b at both ends. The power of the engine 4 is transmitted to the transmission 24 through the transmission shaft 30, the horizontal shaft 29, the intermediate shaft 26, and the endless belt 28.

The rotary mowing unit 12 vertically moves due to the pivotal movement of the up-down lever 15 as described below.

The side frames 1a of the traveling body 1 are interconnected to each other by a pipe 31 bridging between the front wheels 2 and the rear wheels 3 of the traveling body 1. The pipe 31 rotatably receives an operating shaft 32, and an arm 33 projects from each end of the operating shaft 32. The arm includes a tip end connected to the rear link 14 through a connecting rod 34. The rear link supports the rotary mowing unit 12 for vertical movement. Due to this structure, the rotary mowing unit 12 vertically moves upon rotation of the operating shaft 32.

The up-down lever 15 includes a base end mounted to a horizontal shaft 35 rotatably supported behind the operator seat 6 of the traveling body 1. On the other hand, the up-down lever 15 is connected to the operating shaft 32 through a connecting rod 36. As a result, the pivotal movement of the up-down lever 15 in the direction indicated by a solid line arrow A rotates the operating shaft 32 to upwardly move the rotary mowing unit 12 whereas the pivotal movement of the up-down lever 15 in the direction indicated by a dotted line arrow B rotates the operating shaft 32 to downwardly move the rotary mowing unit 12. The horizontal shaft 35 is provided with a projecting arm 37 which includes a tip end connected to the traveling body 1 through a tension spring 38. The spring 38 is urged to pull up the rotary mowing unit 12.

Figure 6:
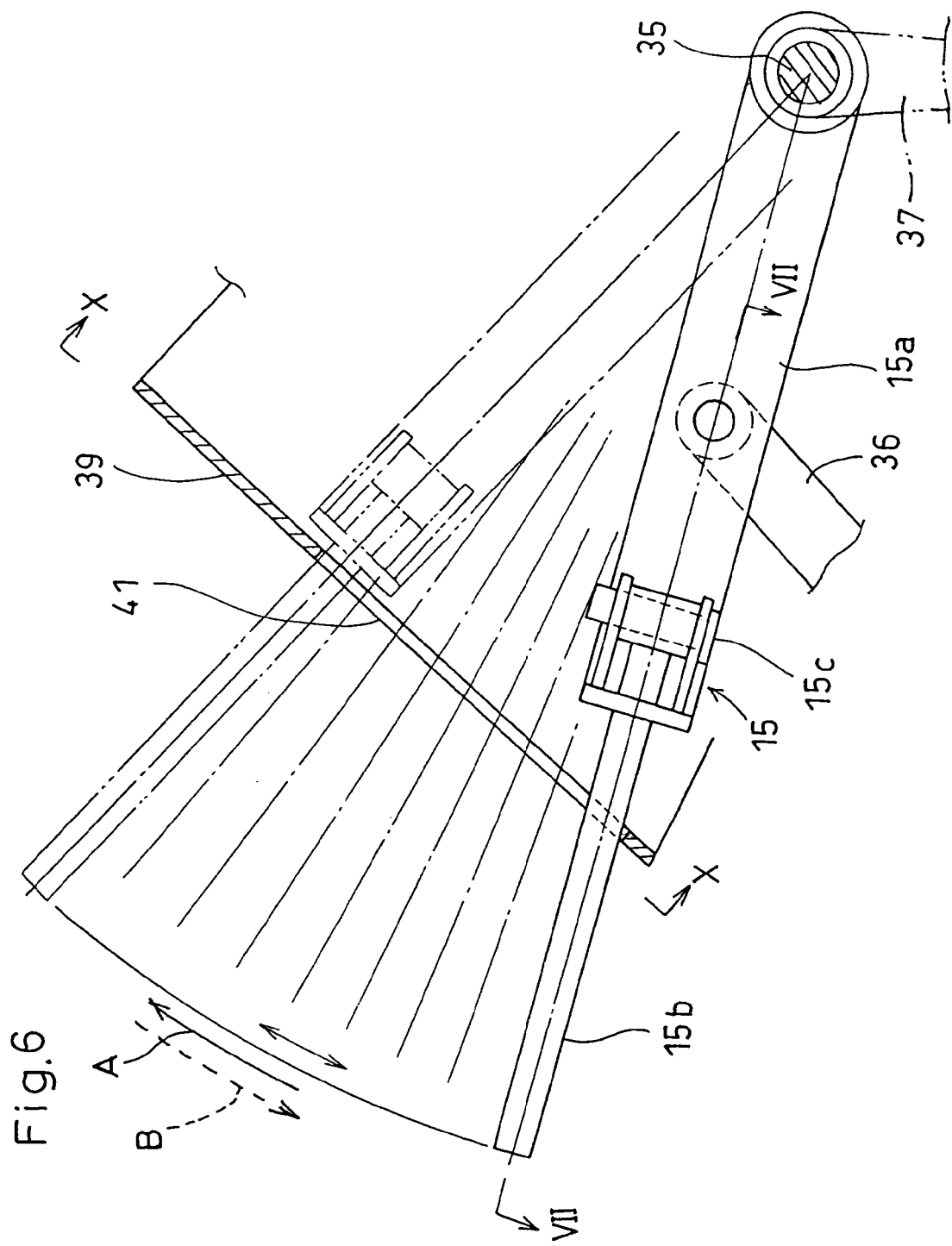
FIG. 6 is an enlarged sectional view taken along lines VI—VI in FIG. 5.
Figure 7:
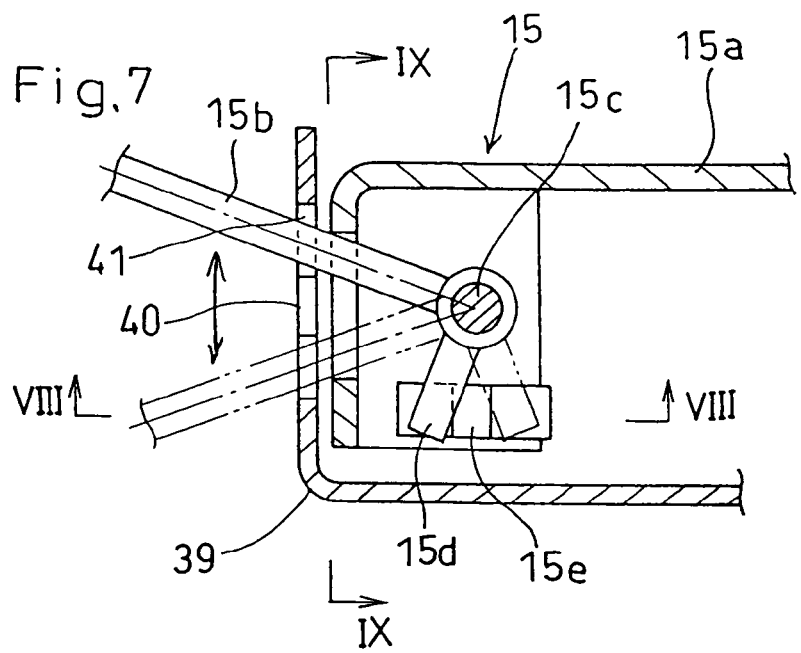
FIG. 7 is a sectional view taken along lines VII—VII in FIG. 6.

The up-down lever 15 further includes, as illustrated in FIGS. 6 and 7, a stem 15a mounted to the horizontal shaft 35 and a handle 15b. The handle 15b is pivoted to the stem 15a through a pin 15c for lateral movement relative to the moving direction of the traveling body 1. Thus, the handle 15b reciprocally pivots between a position closer to the operator seat 6 and another position away from the operator seat 6.

Figure 9:
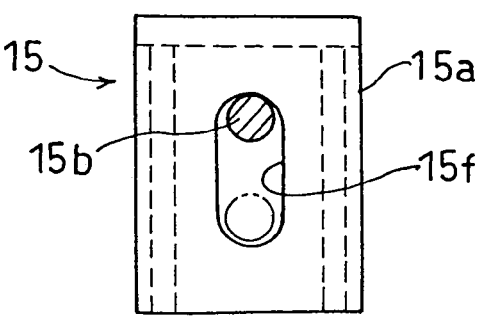
FIG. 9 is a sectional view taken along lines IX—IX in FIG. 7.
Figure 10:
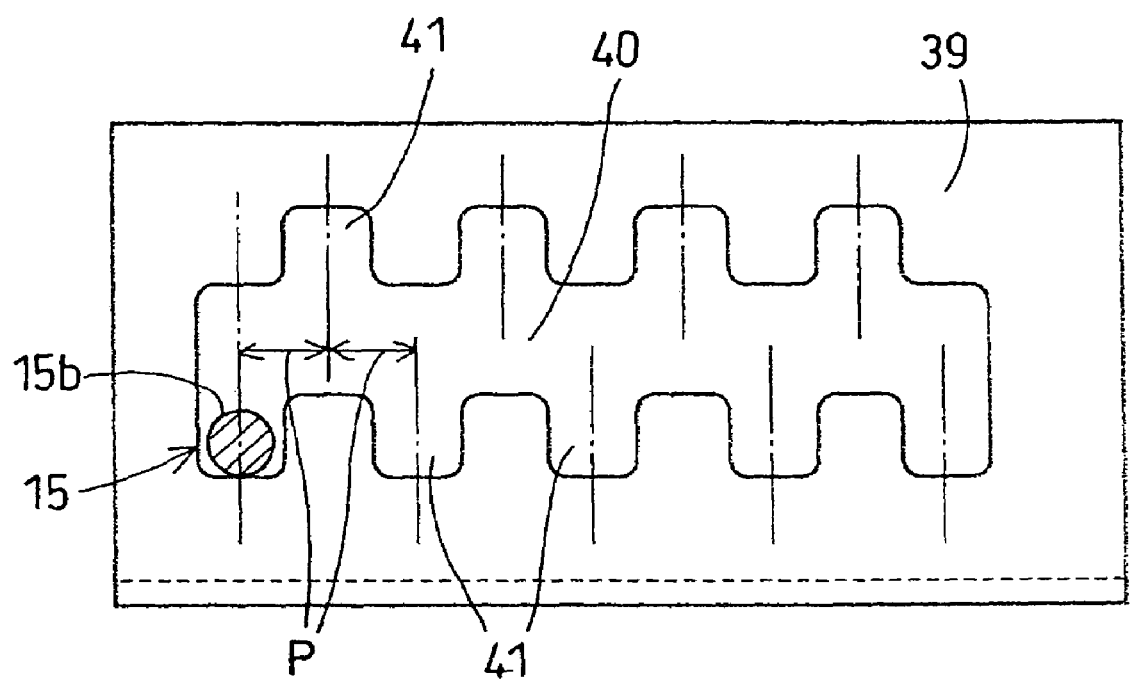
FIG. 10 is a sectional view taken along lines X—X in FIG. 6.

As illustrated in FIG. 9, the laterally reciprocal pivoting movement of the handle 15b is restricted to an angle determined by a slot 15f arranged on the stem 15a.

Figure 8:
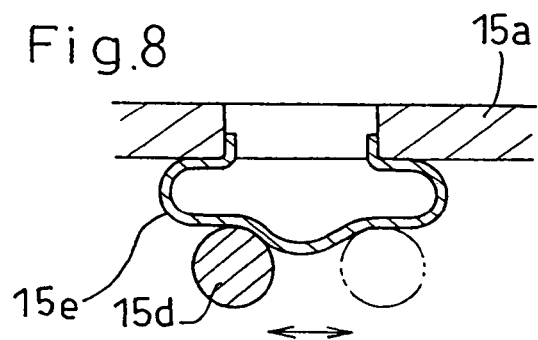
FIG. 8 is a sectional view taken along lines VIII—VIII in FIG. 7.

The handle 15b includes an end provided with a projection 15d that contacts a leaf spring 15e mounted on the stem 15a. Due to this structure, the handle 15b is held by the leaf spring in the position near the operator seat 6 (shown by solid lines) as well as the other position away from the operator seat (shown by broken lines) as illustrated in FIG. 8.

The traveling body 1 is further provided with a guide plate 39 that includes a guide slot 40. The handle 15b of the up-down lever 15 moves longitudinally in the guide slot. The guide slot 40 is flanked by a plurality of detent recesses 41 arranged at a proper pitch P for engagement with the handle 15b by lateral pivoting movement thereof. As a result, it is possible to adjust the height from the ground, of the rotary mowing unit 12 correspondingly to the pitch P between the detent recesses 41.

The traveling body 1 is further provided, on its upside, with a speed change pedal 42 and a brake pedal 43 at the right side in front of the operator seat 6. The speed change pedal 42 is mounted to a hollow shaft 45 that is rotatably supported by the traveling body 1 via a bearing 44, so that the hollow shaft 45 is reciprocally rotated by operating the speed change pedal 42. On the other hand, the brake pedal 43 is mounted to a brake shaft 46 that is rotatably inserted into the hollow shaft 45, so that the brake shaft 46 is reciprocally rotated by operating the brake pedal 43. The brake shaft 46 includes a portion that extends from the hollow shaft 45 to be supported by the traveling body 1 via a bracket 47.

The pipe 31 is further provided with a speed change lever connector 48 and a brake lever connector 49 that pivotally sleeve around the pipe. The speed change connector 48 is connected to the hollow shaft 45 via a connecting rod 50. Due to this structure, pivotal movement of the speed change pedal 42 is transmitted to the speed change gearing of the transmission 24 via the speed change lever connector 48 and a connecting rod 51 for performing a speed change. On the other hand, the brake lever connector 49 is connected to the brake shaft 46 via a connecting rod 52. Due to this structure, pivotal movement of the brake pedal 43 is transmitted to the braking unit of the transmission 24 via the brake connector 49 and a connecting rod 53 for performing a braking operation.

The front links 13 are removably attached to the rotary mowing unit 12. The housing 56 is provided with upwardly extending brackets 56a each having a notch 12a'. Each of the rear links 14 includes a tip end having a connecting pin 14a fitted in the notch. Due to this structure, the rotary mowing unit 12 is removable from the traveling body 1.

Figure 11:
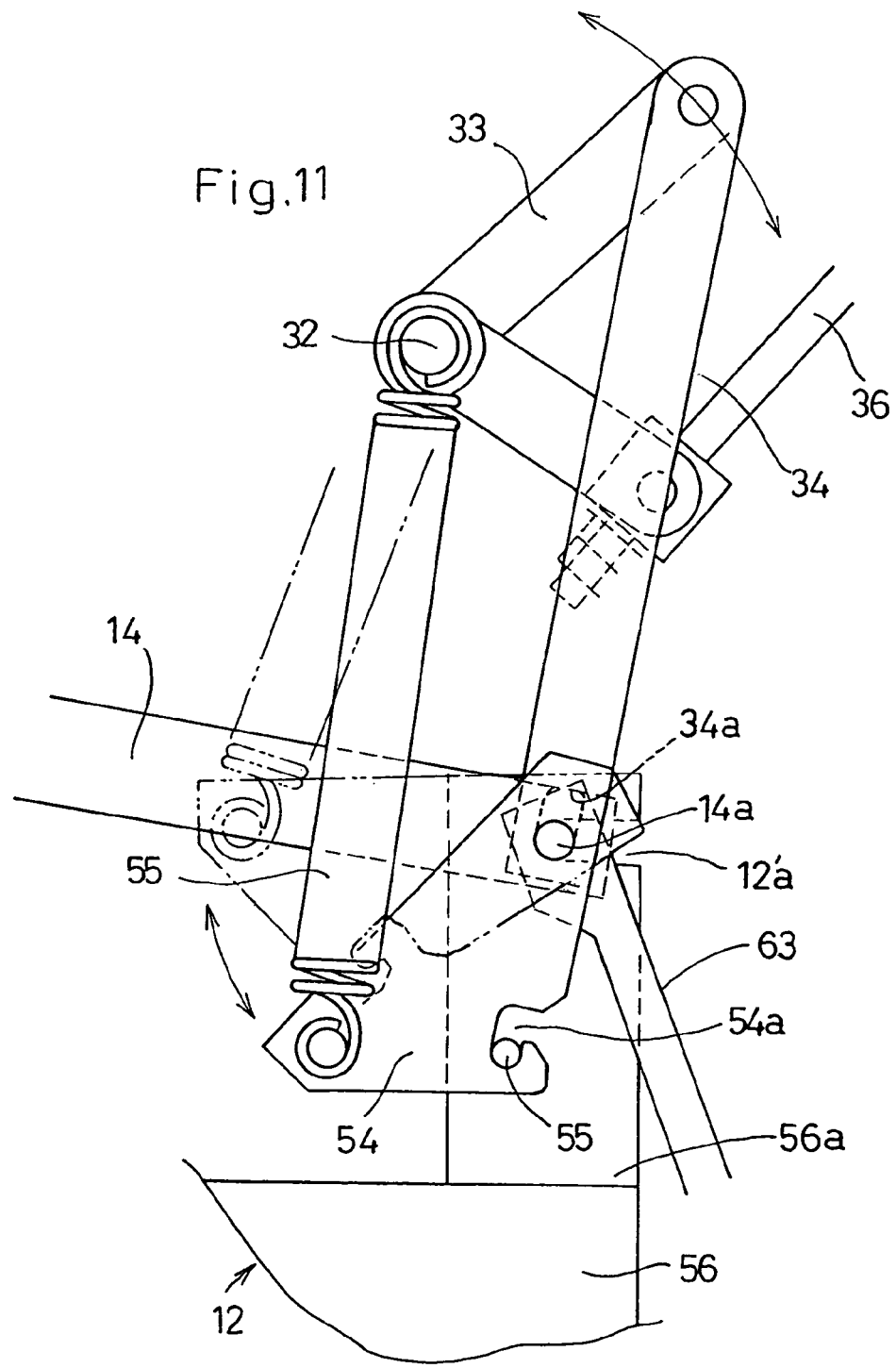
FIG. 11 is a view showing the details of an up-down mechanism.
Figure 12:
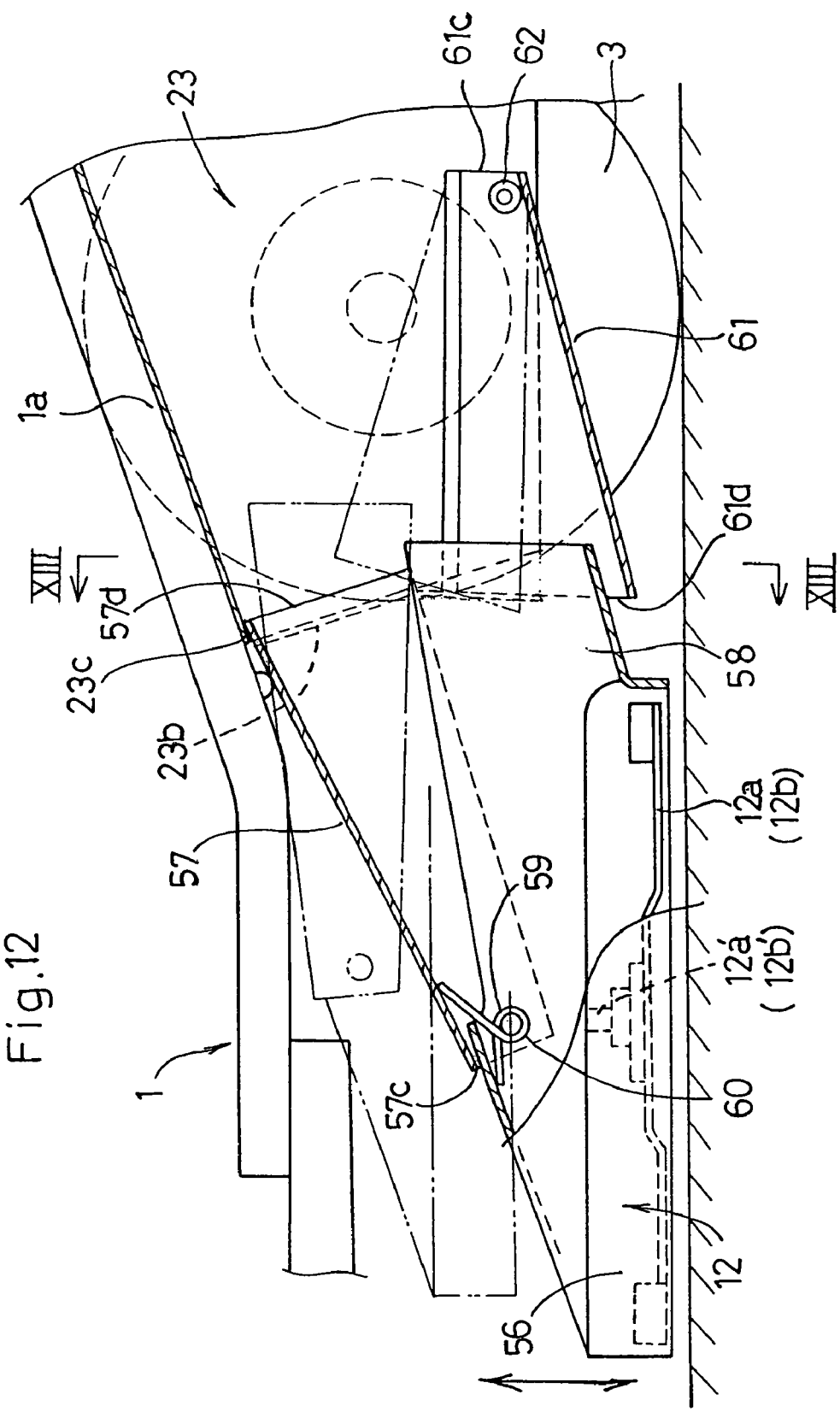
FIG. 12 is an enlarged sectional view taken along lines XII—XII in FIG. 4.
Figure 13:
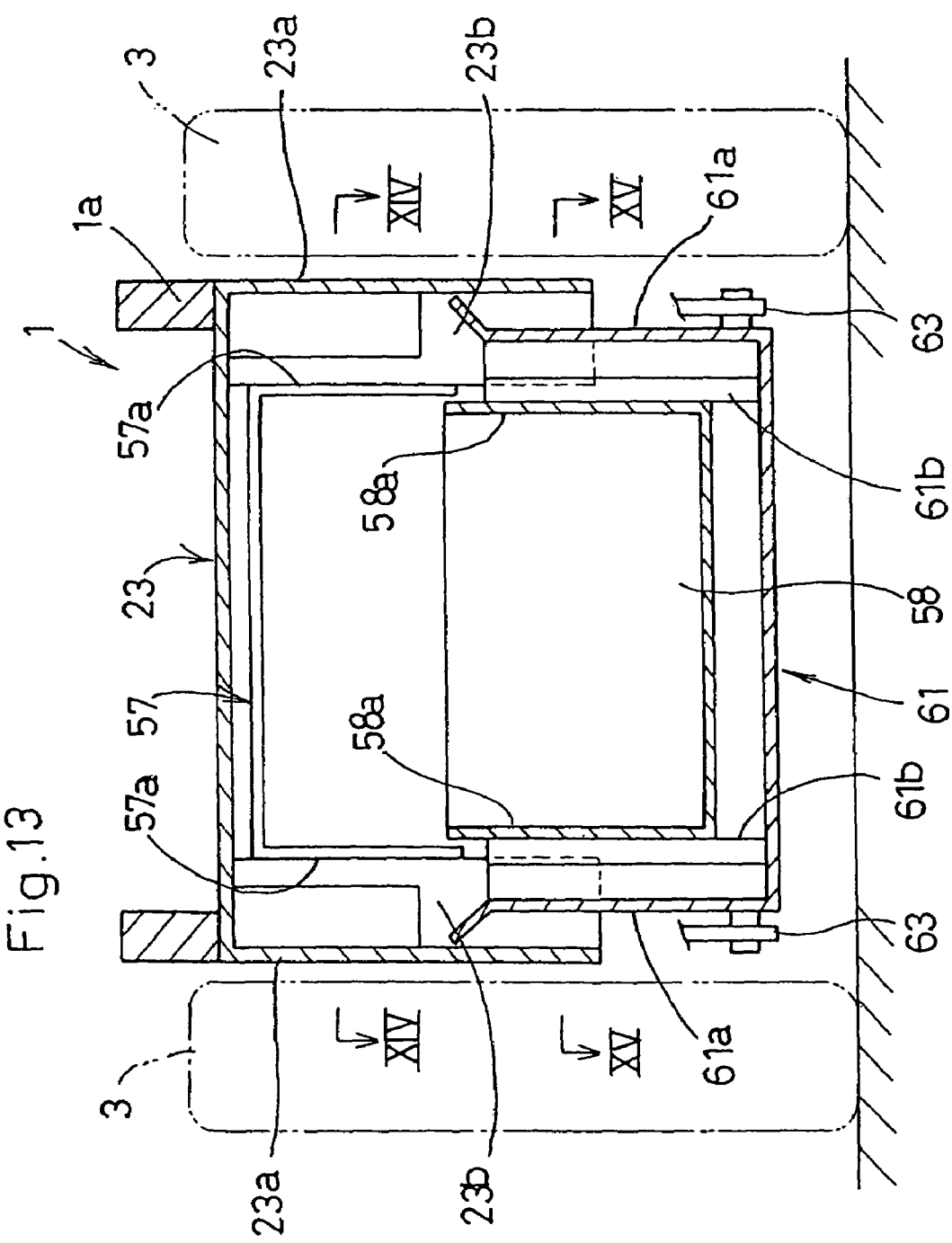
FIG. 13 is a sectional view taken along lines XIII—XIII in FIG. 12.
Figure 14:
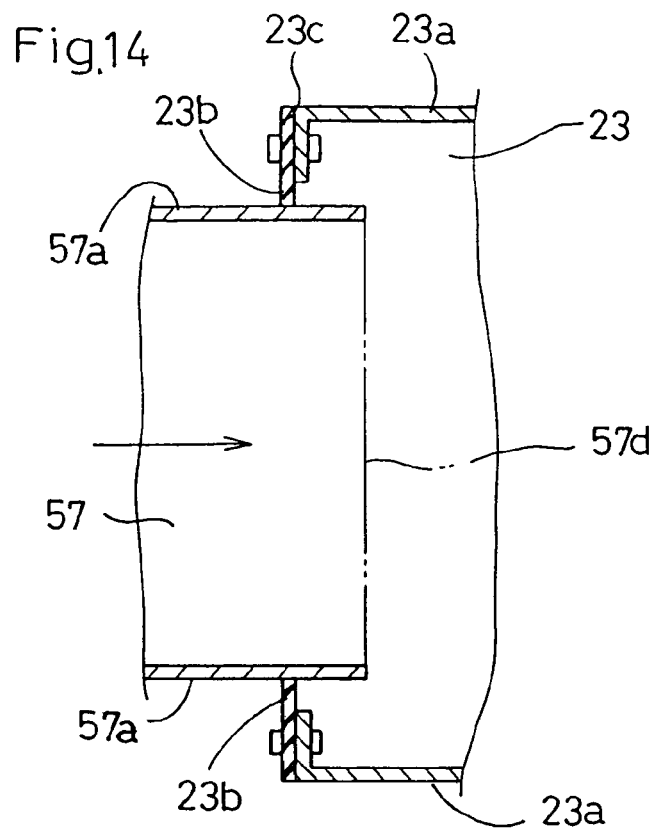
FIG. 14 is a sectional view taken along lines XIV—XIV in FIG. 13.
Figure 15:
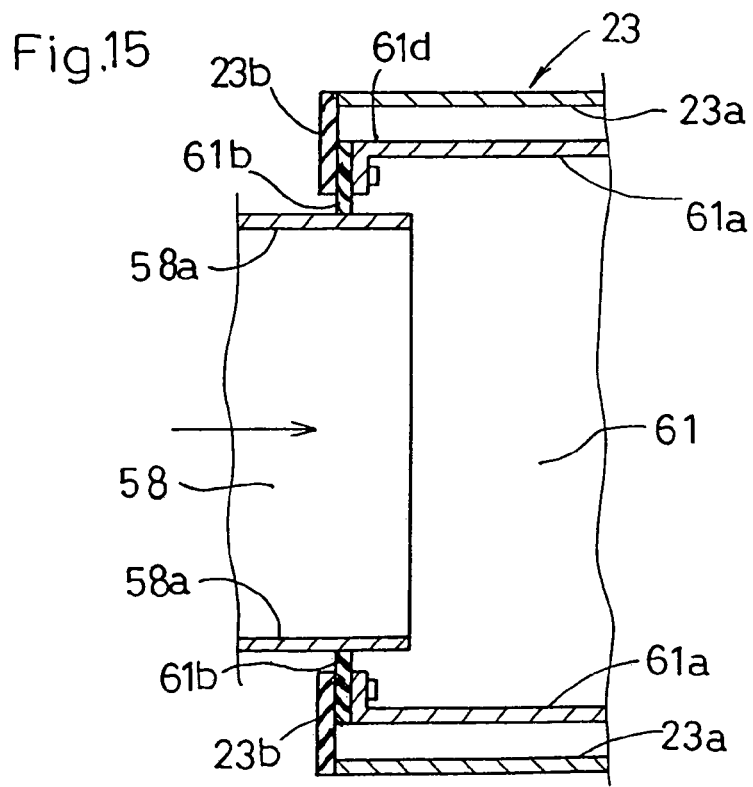
FIG. 15 is a sectional view taken along lines XV—XV in FIG. 13.

The connecting pin 14a at each of the tip ends of the rear links 14 for the rotary mowing unit 12 are further fitted in a slot 34a formed on the connecting rod 34. The connecting pin 14a is rotatably pivoted to a base end of a lever plate 54. The lever plate 54 is provided with a hook-shaped slot 54a for engagement with a pin 55 provided on the bracket 56a. An auxiliary tension spring 55 connects between the lever plate 54 and the operating shaft 32. When the pin 55, as illustrated by solid lines in FIG. 11, is fitted in the slot 54a of the lever plate 54, the spring 55 biases the rotary mowing unit 12 to be pulled up. On the other hand, when the pin 55, as illustrated by broken lines in FIG. 11, is removed from the slot 54a, the spring 55 does not bias the rotary mowing unit. As a result, even the spring 55 is provided, the rotary mowing unit 12 can be removed without removing the spring 55.

The housing 56 of the rotary mowing unit 12 includes an upside provided with an upper duct 57 made of a downwardly open channel. The upper duct extends rearwardly to close an outlet 58 of the housing 56 for mowed grass. The upper duct 57 includes a front end 57c pivotally connected to the housing 56 by a pin 59 so that a rear end 57d of the upper duct 57 moves vertically. The rear end 57d is inserted into the front part of the outlet duct 23 while the upper duct 57 is biased by a torsion spring 60 mounted on the pin 59 so that the rear end 57d is always held at an upper portion in the front part of the outlet duct 23.

Below the outlet duct 23 is provided a channel-shaped lower duct 61 that is upwardly open toward the outlet duct 23 while extending in the same direction as the outlet duct 23. The lower duct 61 includes a rear end 61c pivotally connected to side walls 23a of the outlet duct 23 by pins 62 so that a front end 61d of the lower duct 61 moves vertically. The front end 61d of the lower duct 61 projects beyond the front part of the outlet duct 23. This projecting portion is connected to a lower end of the connecting rod 34 of the rotary mowing unit 12 through a connecting rod 63, for vertical movement together with the rotary mowing unit 12.

The lower duct 61 is smaller in width than the outlet duct 23 and larger than the outlet 58 of the housing 56, while the upper duct 57 is smaller in width than the lower duct 61 and larger than the outlet 58.

The outlet duct 23 includes a front end 23c provided with sealing plates 23b made of a flexible elastic material such as rubber and extending inwardly from side walls 23a, while the lower duct 61 includes a front end 61d provided with sealing plates 61b made of a flexible elastic material such as rubber and extending inwardly from side walls 61a. The sealing plates 23b of the outlet duct 23 also extend downward to contact the front side of the sealing plates 61b.

The sealing plates 23b of the outlet duct 23 further contact the outer surfaces of the side walls 57a of the upper duct 57 while the sealing plates 61b of the lower duct 61 contact the outer surfaces of the side walls 58a of the outlet 58.

The traveling body 1 moves forward with the rotary mowing unit 12 rotating to mow grass. In the above-described structure, the mowed grass is introduced into the outlet duct 23 through the outlet 58 and the upper duct 57 for discharging rearwardly out of the outlet duct 23 or into a grass catcher 64. The grass catcher is removably attached to the rear part of the outlet duct 23, as described below.

Due to the above-described structure, according to the invention, the grass mowed by the rotary mowing unit 12 is introduced into the outlet duct 23 through the upper duct 57 and the lower duct 61 for discharging rearwardly out of the outlet duct 23. On the other hand, when the rotary mowing unit 12 moves downward toward the ground for lowering the mowing height, the front end of the lower duct 61 is lowered accordingly. As a result, the mowed grass can be introduced reliably and smoothly into the outlet duct through the lower duct 61.

Though gaps are necessarily formed between the inner surfaces of the side walls 23a of the outlet duct 23 and the outer surfaces of the side walls of the upper duct 57 that is inserted into the outlet duct, these gaps are closed almost completely with the sealing plates 23b made of a flexible elastic body despite the fact that the upper duct 57 is allowed to pivot.

As described above, the side frames 1a of the traveling body 1 are interconnected to each other by the pipe 31 bridging therebetween. The pipe 31 rotatably receives the operating shaft 32 for rotational operation by the up-down lever 15. The operating shaft 32 is connected to the rotary mowing unit 12 that vertically moves according to the rotation of the operating shaft 32. In this way, the pipe 31 that interconnects the side frames 1a of the traveling body 1 is utilized to support the operating shaft 32 on the traveling body 1 for vertically moving the rotary mowing unit 12.

In other words, the pipe 31 is used doubly as a member for interconnecting the side frames 1a of the traveling body 1 and as a member for supporting the operating shaft 32 on the traveling body 1.

The pipe 31 is also provided with the speed change lever connector 48 and the brake lever connector 49 that rotatably sleeve around the pipe. The speed change connector transmits the movement of the speed change pedal 42 arranged on the traveling body 1 to the gearbox of the traveling body 1. The brake connector transmits the movement of the brake pedal 43 arranged on the traveling body 1 to the brake of the traveling body 1. In this way, the pipe 31 can also be used for pivotally supporting both of the speed change lever connector 48 and the brake lever connector 49 on the traveling body. Of course, the pipe 31 may support only one of the speed change lever connector 48 and the brake lever connector 49.

The speed change pedal 42 is mounted to the hollow shaft 45 pivotally supported on the traveling body 1 while the brake pedal 43 is mounted to the brake shaft 46 pivotally inserted in the hollow shaft 45. Due to this structure, the speed change pedal 42 and the brake pedal 43 can be supported on one supporting shaft. Thus, it is possible to realize a reduction of the mounting space while also simplifying the assembling process and the structure.

The grass catcher 64 includes a box 65 and a bracket 66 for removably mounting the box 65 to the rear end of the side frames 1a of the traveling body 1. The box 65 is surrounded by a cloth or net on all sides other than the front side formed with an opening 65a. The bracket 66 includes sheathes 68 and a pipe 69. The sheathes removably sleeve around the rear ends of the side frames 1a while being fixed thereto by screws 67. The pipe extends laterally to bridge between the sheathes 68.

The pipe 69 of the bracket 66 rotatably receives a supporting shaft 70 which has ends fixed to the upside of the box 65 near the front side. Due to this structure, the box 65 can pivot about the supporting shaft 70 between a forwardly directed position (indicated by solid lines) where the opening 65a of the box 65 faces the rear end of the outlet duct 23 and a downwardly directed position (indicated by broken lines) where the opening 65a is oriented downward.

The supporting shaft 70 includes an end projecting out of the box 65. The projecting end pivotally supports a triangular lever 71. On the other hand, the traveling body 1 includes a rear part between the side frames 1a for rotatably supporting an operating shaft 72 that extends laterally. The operating shaft 72 is provided with an operating lever 73 extending forward at the right side of the operator seat 6. The operating lever 73 has a projecting arm 74 removably connected to the triangular lever 71 on the supporting shaft 70 through a connecting rod 75, whereby the triangular lever 71 pivots counterclockwise in response to upward pivotal movement of the operating lever 73.

The triangular lever 71 is provided with a slot 76 extending along an arc around the supporting shaft 70. The slot engages a pin 77 projecting from the box 65. Due to this structure, when the operating lever 73 pivots upward through a small angle θ1, only the triangular lever 71 pivots counterclockwise but the box 65 does not move. On the other hand, when the operating lever pivots through a large angle θ2 following the angle θ1, the box 65 pivots with the triangular plate 71 in the direction indicated by an arrow C. Thus, the box 65 moves from the forwardly directed position (indicated by solid lines) in which the opening 65a faces the rear end of the outlet duct 23, to the downwardly directed position. (indicated by the broken lines) in which the opening 65a is oriented downward. Conversely, when the operating lever 73 pivots reversely, the box 65 also pivots reversely in the direction indicated by an arrow D for causing the opening 65a to move from the downwardly directed position to the forwardly directed position in which the opening faces the rear end of the outlet duct 23.

The supporting shaft 70 is further provided with a torsion spring 78 biased for holding the box 65 in the forwardly directed position in which the opening 65a faces the rear end of the outlet duct 23. The bracket 66 has a rear end provided with an arcuate link 79 pivotally mounted to circumvent the supporting shaft 70. The box 65 includes a front end provided with a spring 80 extending between the arcuate link 79 and the upper side of the box. The spring 80 is also biased for holding the box 65 in the forwardly directed position in which the opening 65a faces the rear end of the outlet duct 23.

The operation shaft 72 is provided with a torsion spring 81 for pivotally urging the operation lever 73 upward. The torsion spring 81 has a weaker biasing force than the torsion spring 78 and the spring 80.

The box 65 includes a front end provided with a hook lever 83 pivotally mounted on the underside of the box for removably engaging a pin 82 arranged on the rear end of the outlet duct 23 at the underside thereof. The hook lever 83 is also pivotally connected to a connecting rod 84 that has an upper end axially slidably inserted in a connector 85 pivotally mounted on an end of the triangular plate 71. The connecting rod 84 is provided with a ring 86 at the upper end as well as a spring 87 for biasing the connector 85 to abut the ring 86. As a result, on the pivotal movement of the operating lever 73 through the small degree θ1, the hook lever 83 disengages, as indicated by broken lines, from the pin 82 on the traveling body 1 for allowing pivotal movement of the box 65 in the arrow C direction. On downward pivotal movement of the operating lever 73, the box 65 pivots in the arrow D direction for facing the rear end of the outlet duct 23, whereby the hook lever 83 automatically engages the pin 82 for immovably locking the box 65.

When the box 65 is filled with mowed grass, the operating lever 73 is operated upward for pivoting the box 65 around the supporting shaft 70 in the arrow C direction. Thus, the opening 65a of the box 65 moves from the forwardly directed position facing the rear end of the outlet duct 23 (indicated by the solid lines) to the downwardly directed position (indicated by the broken lines), whereby the mowed grass stored in the box is discharged to the ground.

Figure 16:
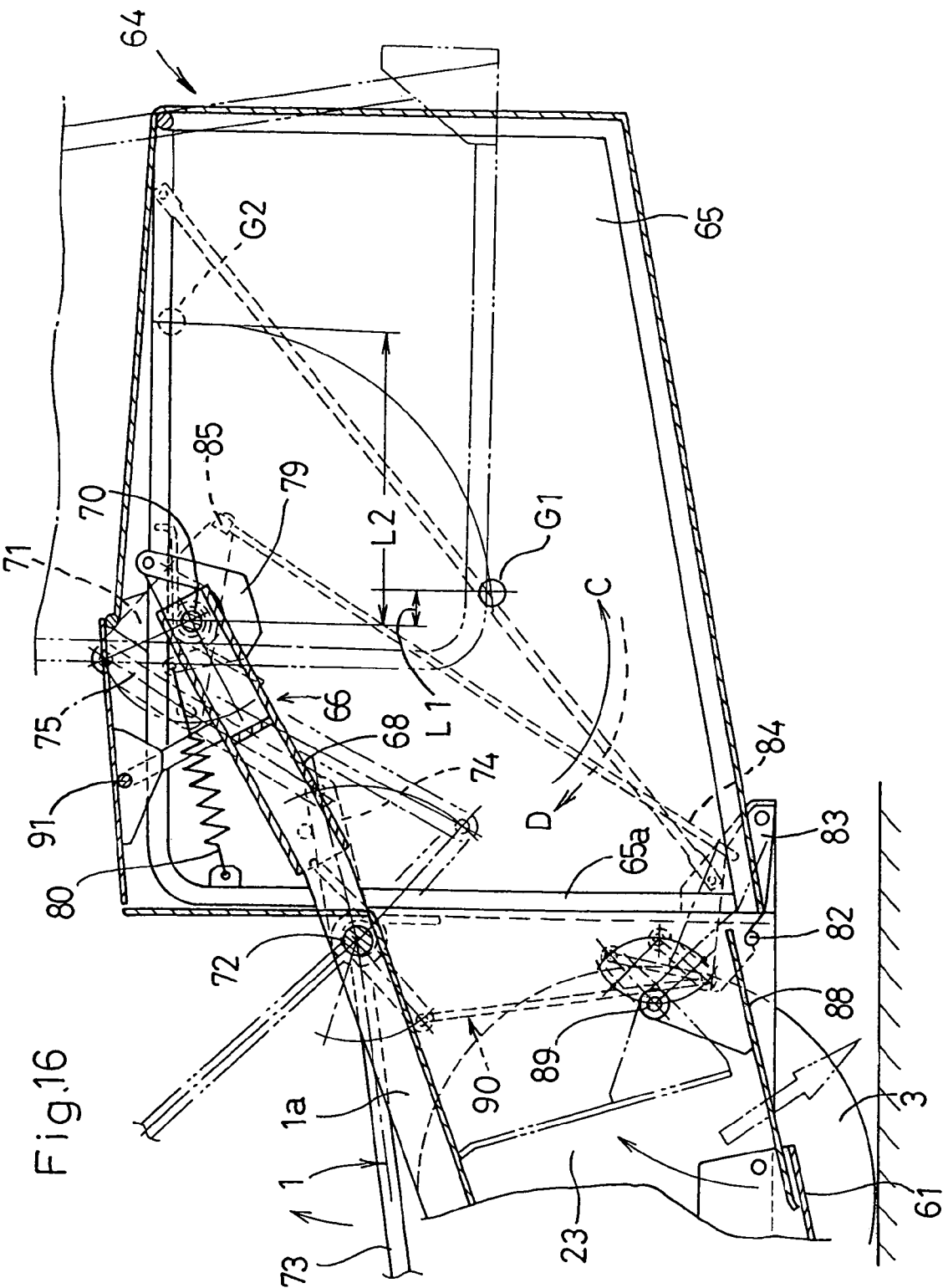
FIG. 16 is an enlarged sectional view taken along lines XVI—XVI in FIG. 2.
Figure 17:
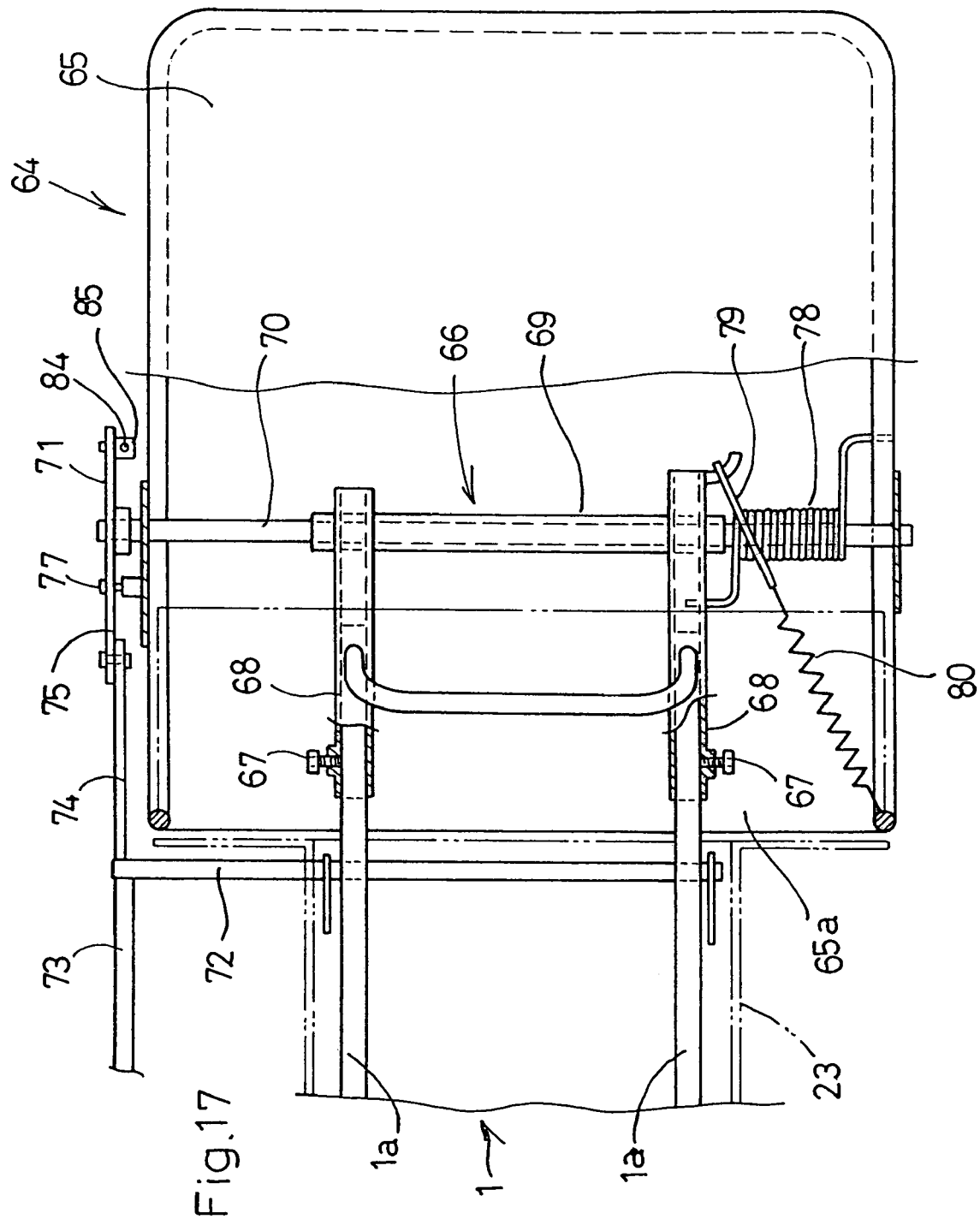
FIG. 17 is a plan view of FIG. 16 as partially cutaway.
Figure 18:
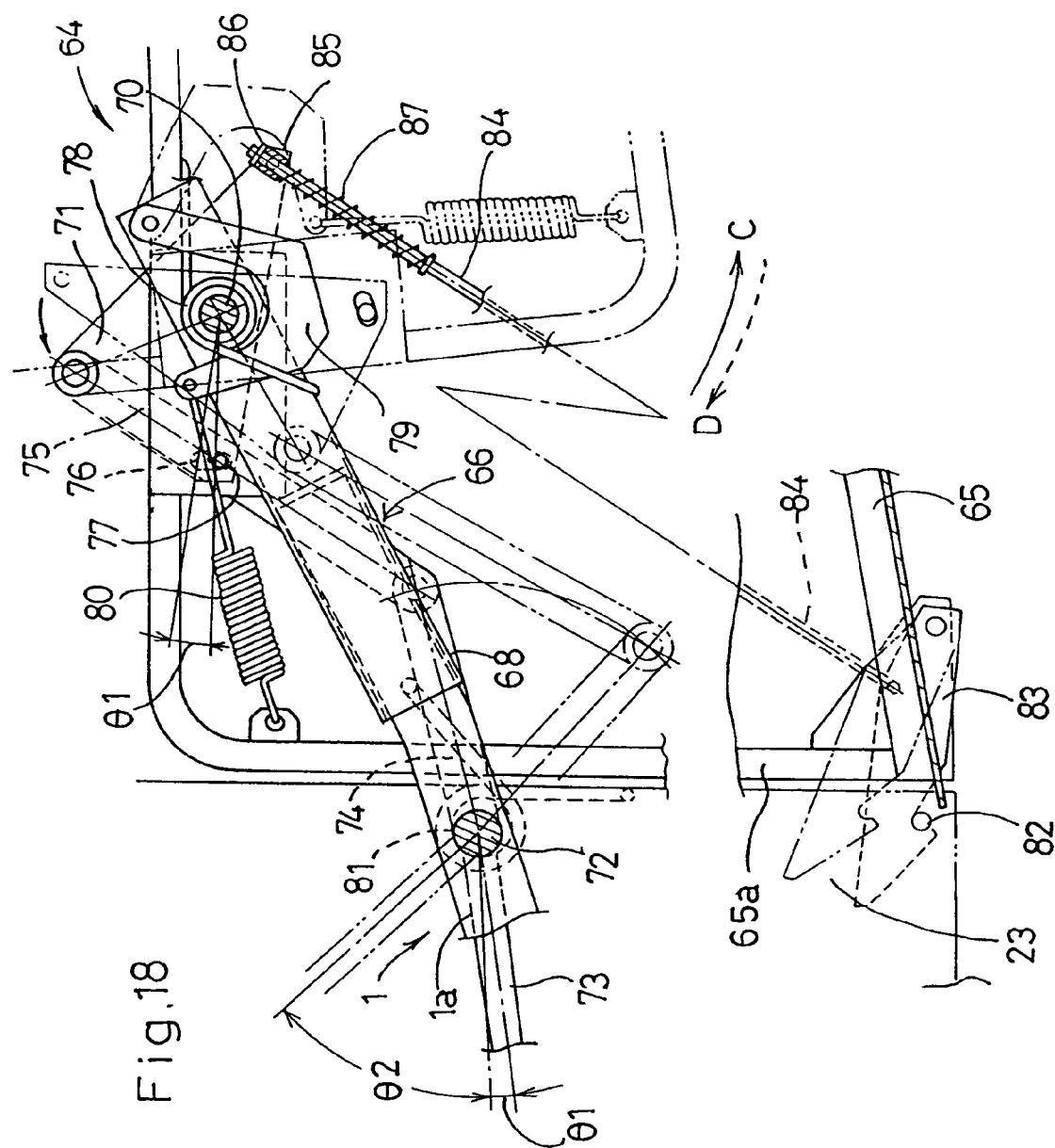
FIG. 18 is an enlarged view showing a principal part of FIG. 16.

Due to the pivotal movement of the box 65 in the arrow C direction, the gravitational center of the box moves from a point G1 to a point G2 as illustrated in FIG. 16. Accordingly, the pivotal movement of the box 65 increases the distance between the supporting shaft 70 as a pivot point and the gravitational center from L1 to L2, thereby increasing the force needed to pivot the operation lever 73.

This problem is overcome by the torsion spring 78 and the spring 80 movable across the pivot point of the supporting shaft 70. The torsion spring 78 tending to pivot the box 65 in the arrow C direction provides a biasing force which progressively weakens as the box 65 pivots in the arrow C direction. Upon pivotal movement of the box 65 in the arrow C direction, the axis of the spring 80 shifts from above the supporting shaft 70 to below the supporting shaft 70 to traverse the pivot point. As a result, the biasing force of the spring 80 causes the box 65 to pivot in the arrow C direction.

In other words, the torsion spring 78 and the spring 80 movable across the pivot point elastically urge the box 65 to pivot in the arrow C direction, thereby reducing the force needed to pivot the box 65.

The rear end of the outlet duct 23 is further provided with a bottom board 88 pivotally mounted by a pin 89 at the underside. The bottom board 88 is connected to the operating lever 72 through a link 90. Due to this structure, the bottom board 88 pivots, in response to upward pivotal movement of the operating lever 72 to pivot the box 65 in the arrow C direction, from the position indicated by solid lines to the position indicated by broken lines, as shown in FIG. 16. Thus, the mowed grass discharged out of the outlet duct 23 is guided downward as indicated by a broken line arrow for preventing the mowed grass from blowing up after the box 65 is pivoted in the arrow C direction.

The grass catcher 64 can be removed from the traveling body 1 by loosening the screws 67 of the sheaths 68 relative to the bracket 66 and by disconnecting the connecting rod 75 to disconnect the operating lever 72 from the triangular plate 71.

The front end of the box 65 provided with a fixed cover 91 supported by the bracket 66 at the upside.

The invention claimed is:

1. A running mower comprising: a traveling body supported by a pair of front wheels and a pair of rear wheels; a rotary mowing unit vertically movably mounted to the traveling body between the front wheels and the rear wheels; and an outlet duct for mowed grass extending backward from underside of the traveling body between the rear wheels, wherein the rotary mowing unit includes an upside provided with a downwardly open channel-shaped upper duct for covering an outlet for mowed grass, the upper duct being pivotally connected for allowing a rear end of the upper duct to move up and down, the rear end of the upper duct being inserted into an upper front end of the outlet duct, the outlet duct being channel-shaped to be downwardly open, underside of the outlet duct being provided with an upwardly open channel-shaped lower duct forming a bottom member of the outlet duct, the lower duct having a rear end pivotally connected for allowing a front end of the lower duct to move up and down, the front end of the lower duct being operatively connected to an up-down mechanism for the rotary mowing unit.

2. The running mower according to claim 1, wherein the front end of the outlet duct is provided with sealing plates made of a soft elastic material, the sealing plates extending inwardly from both sides of the outlet duct while also extending in an up-down direction.

3. The running mower according to claim 1, wherein the traveling body comprises a laterally spaced pair of side frames interconnected to each other by a pipe, the pipe rotatably receiving an operating shaft for rotational operation by an up-down lever, the operating shaft being operatively connected to the rotary mowing unit which vertically moves in response to rotation of the operating shaft.

4. The running mower according to claim 3, wherein the pipe pivotally supports a speed change lever connector and/or a brake lever connector, the speed change lever connector transmitting movement of a speed change pedal arranged on the traveling body to a speed change mechanism of the traveling body, the brake lever connector transmitting movement of a brake pedal arranged on the traveling body to a brake mechanism of the traveling body.

\* \* \* \* \*